Sept. 5, 1950 L. MARGOLIS 2,521,013
STRAINER
Filed Sept. 3, 1948
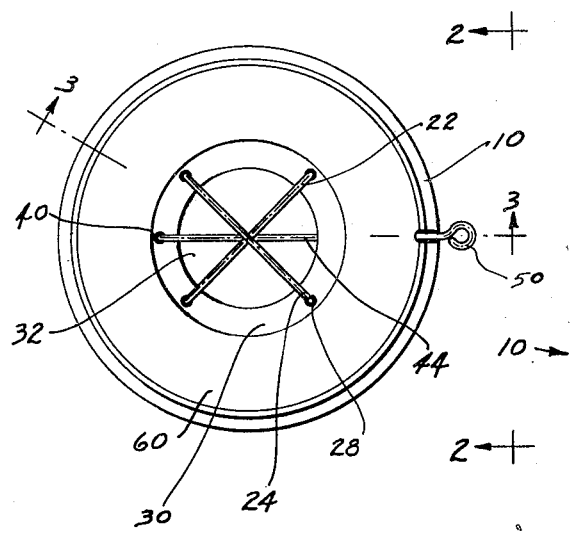
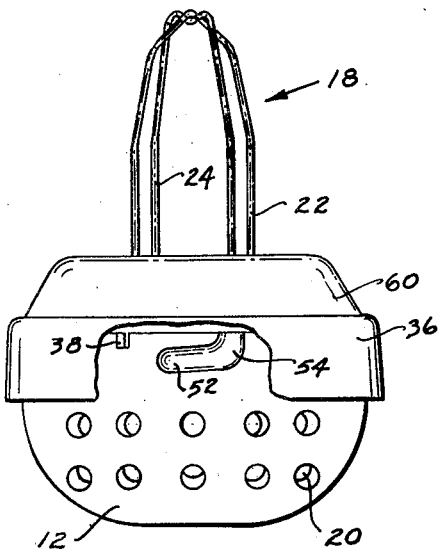
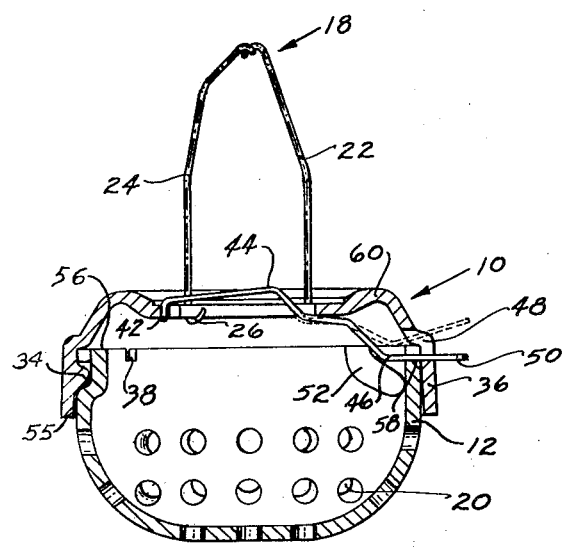
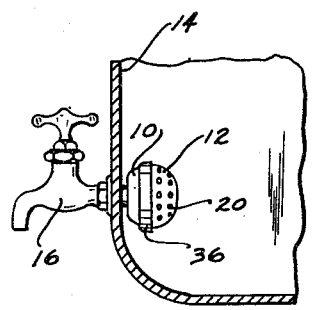
INVENTOR.
LOUIS MARGOLIS
BY
Irving P. Goodfriend
ATTORNEY Patented Sept. 5, 1950

2,521,013

UNITED STATES PATENT OFFICE 2,521,013

STRAINER

Louis Margolis, New York, N. Y.

Application September 3, 1948, Serial No. 47,581

4 Claims. (Cl. 210—170)

The present invention relates to a drain for straining sediment from a liquid drawn from a container of the liquid.

In establishments, such as restaurants, it is desired to draw off clear liquid, such as soups and broths, from relatively large pots in which they are held. The soups ofttimes contain as a sediment relatively large pieces of meat and vegetables, which it is desired to exclude from the liquid drawn off from the pot.

In the prior art drains have been provided that customarily are permanently mounted in position in the containers or pots or are so constructed that they are comparatively difficult to clean.

The present invention contemplates the provision of a drain that is arranged and constructed so that it may be removably mounted in a pipe at the entrance thereto through which a liquid is drawn.

The present invention further contemplates the provision of a drain that is composed of two separable parts, one part being the base which is removably mounted in the pipe and the other part being a screening member, which when desired, may be separated from the base for cleaning purposes.

The present invention also contemplates the provision of a novel means for locking the screening member of such a drain on the base member thereof and the provision of a simple resilient means for removably securing the base member of the drain to a pipe through which clear liquid may be circulated.

These, other and further objects and advantages of the present invention will be clear from the description which follows and the drawing appended thereto, in which Fig. 1 is a top plan view of a drain according to my invention.

Fig. 2 is a side elevational view on the line 2—2 of Fig. 1, the base member of the drain being partially broken away to disclose the rear of a locking groove on the screening member.

Fig. 3 is a section on the line 3—3 of Fig. 1.

Fig. 4 is an illustrative side elevation, to reduced scale, of a pot, broken away, showing my drain removably secured in the interior of the pot at the entrance to the pipe communicating with a spout by means of which liquid is drawn off from the pot.

Referring now to the drawing, a drain according to my invention comprises the hollow base 10 and the hollow screening member 12 which is removably mounted on it at the lower open end of the base.

In the illustration given, the drain is shown for use with a pot 14, such as that used in a restaurant and from which a clear liquid, such as soup or broth, is to be drawn from the pot by means of the valve controlled spout 16.

The resilient securing means 18 is inserted in the pipe leading to the spout 16 so that the screening member 12, having the spaced openings 20, is positioned in front of the entrance to the spout and prevents large particles of sediment, such as pieces of meat, bits of vegetables and the like from being drawn off from the pot 14 with the clear liquid circulating through the spout 16.

While I have illustrated the drain as mounted in a restaurant pot, it will be understood that the drain of the present invention may be used in any installation in which it is sought to filter any particles from a liquid that is to be circulated through a pipe.

Since the drain of the present invention, as illustrated, is used in the restaurant trade, the screening member 12 is comparatively large as are the openings 20, the screening member 12 and base 10 being made from a rigid metal, preferably aluminum and are relatively thick in cross section, approximately one-eighth to three-sixteenths of an inch.

The resilient securing means is formed by the cross members 22 and 24 each formed from a rigid but sufficiently resilient wire and does not interpose an obstruction to the flow of the liquid.

Each end 26 of the wire extends through an opening 28 in the depressed flange 30 at the central open portion 32 of the base member 10.

The end 26 at the underside of the flange 30 is bent upwardly and over the flange to form a clasp which rigidly holds the cross members 22 and 24 of the fastening means in place.

It will now be recognized that the fastening means 18 is a relatively simple one that is inexpensive to manufacture and which may be inserted in the interior of a pipe, from which it may be removed, if desired, and which fastening means is so mounted on the base 10 that the central opening 32 is aligned in communication with the pipe on which the base is secured.

In order to separably lock the member 12 on the base 10, I may provide cooperating lugs or fingers 34 on the collar 36 at the bottom edge or lower end of the base and which lugs or fingers extend inwardly thereof.

These fingers are preferably three in number and are spaced from each other one hundred and twenty degrees so that they are uniformly distributed around the base.

At the upper part of the screening member 12,

I provide a plurality of open ended slots 38, which as will be described are also equally spaced from each other one hundred and twenty degrees and one of which slots receives a catch in a manner that I shall further describe in detail.

In order to provide a means for separably locking the member 12 on the base 10, I secure in an opening 40 in the flange 30, one end 42 of the catch member 44, which is formed from a rigid but bendable wire and bent adjacent the other end to pass under the flange 30 and form the bend 46.

The catch member 44 extends from the bend 46 through the slot 48, extending in the base 10 above the collar 36, into the finger piece 50, which is thus positioned on the outside of the base. The catch member 44 is sufficiently resilient so that normally the finger piece 50 is downwardly tensioned against the lower closed end of the slot 48.

Adjacent each slot 38 and spaced therefrom I provide a groove-like depression having a substantially horizontal portion 52 which extends at a slight inclination into the substantially vertical portion 54, open at the upper edge or rim 56 of the screening member 12.

The screening member 10 is molded so that the groove 52 and 54 has a rear wall 55 that is positioned inwardly of the screening member 12, as illustrated in Fig. 3.

Upon mounting the member 12 on the base 10, each lug or finger 34 is received in a vertical portion 54 of an aligned groove-like depression, which depressions are also spaced from each other one hundred and twenty degrees so that they are similarly uniformly spaced around the member 12 and each one of which therefore will receive a lug or finger 34.

In this position, the substantially horizontal element 58 of the catch member 44 between the bend 46 and the finger piece 50 is held on the upper rim or edge 56 by the inherent downward tension (as viewed in Fig. 3) of the member 44.

The screen member 12 is then rotated in a counter-clockwise direction, that is from left to right of Figs. 1 and 2.

Each lug or finger 34, which is rounded off for ease of operation, having entered the vertical portion 54 of a groove is thereby relatively brought home in locking position to the closed end of the horizontal portion 54.

A slot 38 is spaced from the closed end of each horizontal portion 52 so that the element 58 is correspondingly brought above a slot 38 into which it springs by reason of the inherent tension of the member 44 to thereby lock the screen member 12 on the base 10 when a lug or finger 34 is thus brought to the end of a horizontal portion 52 of the groove-like depression.

The screen member 20, which is preferably dome shaped to provide a larger area for the openings 20, which openings are arranged in the sides and bottom of the dome, filters out any large particles from the liquid as it is drawn off by the nozzle 16 from the pot 14.

In order to clean the screen member 20, it is not necessary to remove the entire drain from the pipe but only to separate the member 20 from the base 10.

This is accomplished by raising the element 58 out of the slot 38 into which it has sprung, as illustrated by the broken lines of Fig. 3, and then rotate the member 20 a clockwise direction, that is from the left to the right of Figs. 1 and 2.

By this movement, the lugs or fingers 34 move through the horizontal portions 52 of each groove-like depression in which it is located until the lug or finger is brought into the vertical portions 54, throughout which movement the horizontal portion 58 rides on the rim or edge 56.

When the lugs or fingers 34 are located in the vertical portions 54, the screen member 20 may be pulled away from out of the recess formed by the collar 36 and the crown 60 and thus separated from the base 10, whereupon the member 12 may be cleaned.

After the member 12 has been cleaned, it may be returned to its locked position on the base 10 in the manner previously described.

As various possible embodiments might be made of the above invention, and as various changes might be made in the embodiment set forth, it is to be understood that all matter herein set forth or shown in the accompanying drawing is to be interpreted as illustrative and not in a limiting sense.

I claim:

1. In a drain to be mounted at the entrance to a pipe, a hollow base member having a crown provided with an opening at the center thereof, a collar forming a recess and a flange around the opening, said base having a slot extending upwardly between the collar and the crown, a dome shaped screen member having apertures spaced therearound and detachably received in the recess, a resilient means for removably mounting the base in the pipe, said means comprising a pair of cross members, the ends of the cross members secured to the flange, a locking member secured at one end to the flange and extending across the opening through the slot and tensioned against the bottom of said slot, upon inserting the screen member in the recess in the base, said locking member positioned against the upper edge of the screen member, said screen member having an open slot extending down from the upper edge thereof and said screen member having a depression forming groove, said groove having a vertical portion open at the upper edge of the screen member and extending into a horizontal portion and a lug extending into the recess on the interior of the collar to be received in the groove upon receiving the screen member in the recess, said locking member received in the slot upon location of the lug at the end of the horizontal portion of the groove.

2. In a drain, a hollow base, a hollow screen base, a lug on the interior of the base, means on the screen member for receiving the lug upon receiving the screen member in the base, said screen member movable with respect to the base to bring the lug home in locking position in the said lug receiving means, and a resilient member secured thereto adjacent one side of the base and extending through the base in a side thereof opposite to the first mentioned side and tensioned against the screen member upon receiving said screen member in said base, said screen member having an open ended slot for receiving therein the said resilient member upon bringing the lug home in the means for receiving the lug.

3. The drain of claim 2 and including cross members extending outward from the base for resiliently removably holding the base at the entrance to a pipe upon insertion of the cross members in the pipe with the drain at the entrance thereto.

4. In a drain, a base member, a projection extending inward on the inside thereof, a screen member for insertion in the base member and open at the upper edge thereof and having a groove said groove having a vertical portion open at the upper edge, for receiving therein the said projection upon inserting the screen member in the base member, said groove having a horizontal portion communicating with the vertical portion, said screen member movable with respect to the base upon inserting the screen member thereinto, said screen member having a slot open at the upper edge of the screen member and an element on the base and slidable upon the upper edge of the screen member and tensioned thereagainst upon movement of the screen member relative to the base, said projection being brought home in locking position in the horizontal portion of the groove, said element received in the slot in the screen member upon bringing the projection home in the horizontal portion of the groove.

LOUIS MARGOLIS.

REFERENCES CITED

The following references are of record in the file of this patent:

UNITED STATES PATENTS

| Number | Name | Date |
| --- | --- | --- |
| 586,377 | Bossinger | July 13, 1897 |
| 1,137,190 | Cook | Apr. 27, 1915 |
| 1,444,135 | O'Connor | Feb. 6, 1923 |
| 1,666,725 | Weinheim | Apr. 17, 1928 |